(12) United States Patent
Ohmori

(10) Patent No.: US 11,679,807 B2
(45) Date of Patent: Jun. 20, 2023

(54) DRIVING ASSISTANCE DEVICE FOR VEHICLE

(71) Applicant: ADVICS CO., LTD., Kariya (JP)

(72) Inventor: Yosuke Ohmori, Kariya (JP)

(73) Assignee: ADVICS CO., LTD., Kariya (JP)

( * ) Notice: Subject to any disclaimer, the term of this patent is extended or adjusted under 35 U.S.C. 154(b) by 128 days.

(21) Appl. No.: 17/258,353

(22) PCT Filed: Jul. 29, 2019

(86) PCT No.: PCT/JP2019/029696
§ 371 (c)(1),
(2) Date: Jan. 6, 2021

(87) PCT Pub. No.: WO2020/027066
PCT Pub. Date: Feb. 6, 2020

(65) Prior Publication Data
US 2021/0291903 A1  Sep. 23, 2021

(30) Foreign Application Priority Data

Jul. 31, 2018  (JP) .............................. JP2018-143923

(51) Int. Cl.
*B62D 15/02* (2006.01)
(52) U.S. Cl.
CPC ......... *B62D 15/021* (2013.01); *B62D 15/025* (2013.01)
(58) Field of Classification Search
CPC .................. B62D 15/021; B62D 15/025
See application file for complete search history.

(56) References Cited

U.S. PATENT DOCUMENTS

| 2007/0239333 A1* | 10/2007 | Galkowski | ........... | B62D 15/025 |
| | | | | 701/41 |
| 2010/0145575 A1* | 6/2010 | Switkes | ............... | B62D 15/025 |
| | | | | 701/41 |

(Continued)

FOREIGN PATENT DOCUMENTS

| JP | 2000-72021 A | 3/2000 | | |
| JP | 3694423 B2 * | 9/2005 | ............. | B62D 1/286 |

(Continued)

OTHER PUBLICATIONS

International Search Report dated Oct. 15, 2019 in PCT/JP2019/029696 filed on Jul. 29, 2019, 2 pages.

*Primary Examiner* — Peter D Nolan
*Assistant Examiner* — Demetra R Smith-Stewart
(74) *Attorney, Agent, or Firm* — Oblon, McClelland, Maier & Neustadt, L.L.P.

(57) ABSTRACT

A control device is applied to a vehicle including a steering device changing a tire angle in synchronization with a change in a steering angle while assisting in steering by driving an electric machine. The control device performs a steering support control for controlling a tire angle and a steering angle by driving the electric machine. The control device includes a control drive amount calculation unit calculating a control drive amount based on the target tire angle in a state where the steering support control is executed. The control device includes a steering drive amount calculation unit calculating a steering drive amount being a drive amount of the electric machine related to a steering torque. The control device includes a control unit that controls the electric machine based on the cooperative drive amount, during steering movement of the driver in a state where the steering support control is executed.

6 Claims, 6 Drawing Sheets

(56) References Cited

U.S. PATENT DOCUMENTS

| | | | |
|---|---|---|---|
| 2015/0191200 A1 | 7/2015 | Tsubaki et al. | |
| 2015/0274158 A1 | 10/2015 | Fujita | |
| 2017/0036694 A1* | 2/2017 | Okuda | B62D 6/02 |
| 2018/0273026 A1* | 9/2018 | Oyama | B60W 30/18145 |
| 2019/0039648 A1* | 2/2019 | Kitta | B62D 5/0463 |
| 2019/0291747 A1* | 9/2019 | Chiba | B60W 30/00 |

FOREIGN PATENT DOCUMENTS

| | | | |
|---|---|---|---|
| JP | 6153111 B2 | 6/2017 | |
| WO | WO 2014/073079 A1 | 5/2014 | |
| WO | WO 2014/136515 A1 | 9/2014 | |

* cited by examiner

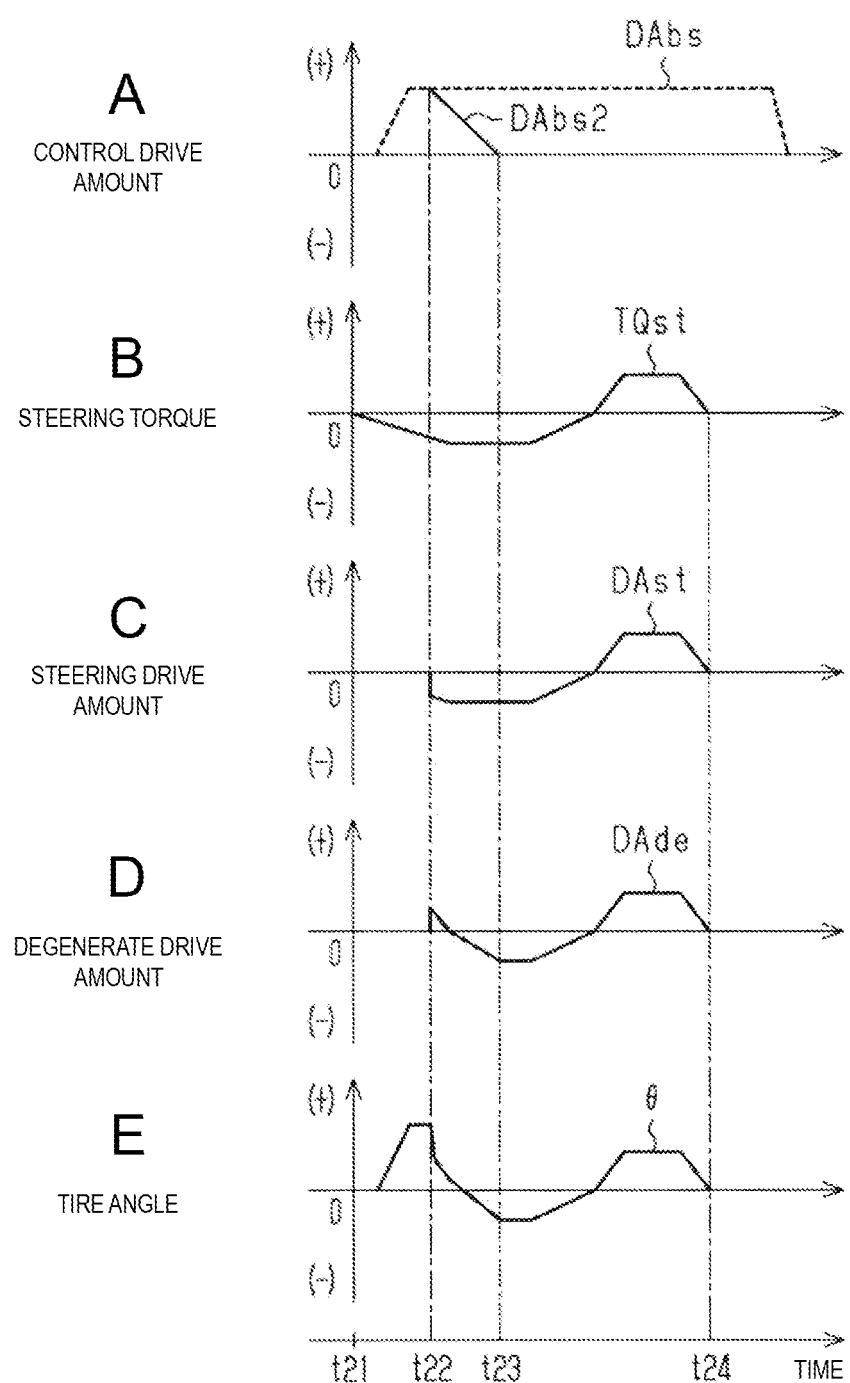

DRIVING ASSISTANCE DEVICE FOR VEHICLE

TECHNICAL FIELD

The present disclosure relates to a driving assistance device for a vehicle.

BACKGROUND ART

PTL 1 discloses a steering control device that controls a tire angle that is a steering angle of a wheel in synchronization with a steering angle that is a rotation angle of a steering wheel. In this device, a target steering angle that is a target value of the steering angle is set. An assist torque is applied to the steering wheel so that the actual steering angle is close to the target steering angle.

CITATION LIST

Patent Literature

PTL 1: JP-A-2000-72021

SUMMARY

Technical Problem

As driving support control for a vehicle, a steering support control that assists in changing the steering angle of the steering wheel to automatically bring the tire angle of the wheel close to a target tire angle is known. A driver may perform steering in a state where such steering support control is executed. In this case, the tire angle may be different from the target tire angle by steering, and a large torque that prevent a rotation of the steering wheel may be applied to the steering wheel. As a result, the steering wheel state related to the driver maneuver is different form the actual steering wheel state. This may cause discomfort to the driver.

Solution to Problem

A driving assistance device for solving the above issue that is applied to a vehicle including a steering device that, by driving an electric motor, assists steering and changes a tire angle which is a steering angle of a vehicle wheel according to a change in a steering angle which is a rotation angle of a steering wheel, and that implements steering support control for changing the tire angle and the steering angle by driving the electric motor based on a target tire angle which is a target value of the tire angle, the driving assistance device for a vehicle including: a control drive amount calculation unit that calculates a control drive amount in a state where the steering support control is being executed, the control drive amount being a drive amount of the electric motor based on the target tire angle; a steering drive amount calculation unit that calculates a steering drive amount, which is a drive amount of the electric motor, according to a steering torque which is a torque input to the steering wheel by steering; and a control unit that, during steering movement of the driver in a state where the steering support control is being executed, calculates a sum of the control drive amount and the steering drive amount as a cooperative drive amount and controls the electric motor based on the cooperative drive amount.

When the steering support control is implemented, by driving the electric motor based on the control drive amount, not only the tire angle of the wheel, but also the steering angle of the steering wheel is changed. That is, it can be said that an output torque of the electric motor is also input into the steering wheel.

According to the above configuration, when the driver steers the steering wheel in a state where the steering support control is being executed, the electric motor is driven based on the cooperative drive amount. The cooperative drive amount is a value that reflects not only the control drive amount based on the target tire angle, but also the steering drive amount based on the steering torque due to the steering of the driver. The steering drive amount is a control amount of the electric motor for assisting the rotation of the steering wheel caused by the steering performed by the driver. Therefore, by driving the electric motor based on the cooperative drive amount, the steering angle of the steering wheel can be changed according to the steering torque. Then, the tire angle of the wheel changes in synchronization with such a change in the steering angle. That is, the wheels can be steered according to the steering performed by the driver.

Therefore, during steering movement in a state where the steering support control is being executed, the mode of steering of a wheel corresponding to the steering performed by the driver and the mode of actual steering are not different, so that it is possible to prevent the driver from feeling uncomfortable.

BRIEF DESCRIPTION OF DRAWINGS

FIGS. 9A to 9E are timing charts in the degenerate mode.

DESCRIPTION OF EMBODIMENTS

Hereinafter, a control device 10 which is an example according to the embodiment of a driving assistance device for a vehicle will be described with reference to FIGS. 1 to 9.

Figure 1:
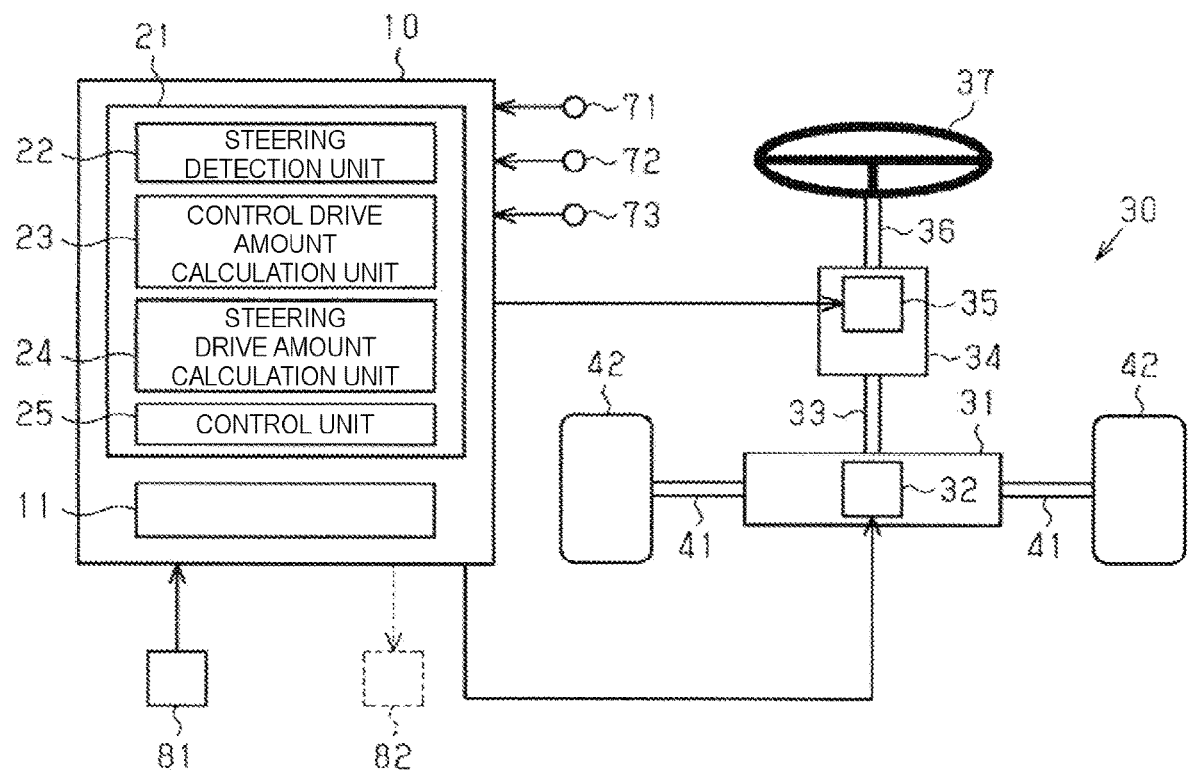
FIG. 1 is a diagram showing a functional configuration of a control device, which is an example according to an embodiment of a driving assistance device for a vehicle, and a schematic configuration of a steering device controlled by the same control device.

FIG. 1 shows the control device 10 and a steering device 30 controlled by the control device 10. The steering device 30 includes an electric machine 31 that controls a steering angle of steered wheels 42 of the vehicle. The electric machine 31 includes a first motor 32 as a power source. The electric machine 31 is connected to the steered wheels 42 via tie rods 41. Further, the steering angle of the steered wheels 42 can be adjusted by driving the electric machine 31.

The steering device 30 includes a steering wheel 37 that is operated by a driver of the vehicle. The steering wheel 37 is connected to a steering input shaft 36. If the steering wheel 37 is operated, the steering input shaft 36 rotates integrally with the steering wheel 37. The steering input shaft 36 is connected to a connecting mechanism 34. The connecting mechanism 34 includes a second motor 35 as a power source that applies a torque to the steering input shaft 36. The connecting mechanism 34 is connected to the electric machine 31 via a steering output shaft 33. The connecting mechanism 34 can adjust a difference between a rotation angle of the steering input shaft 36 and a rotation angle of the steering output shaft 33 by driving the second motor 35. When a drive of the second motor 35 of the connecting mechanism 34 is stopped, the steering input shaft 36 rotates in synchronization with the steering output shaft 33.

The steering device 30 includes a steering angle sensor 72, a steering torque sensor 73, and a tire angle sensor 71 as a detection system.

The steering angle sensor 72 detects a steering angle $\alpha$, which is a rotation angle of the steering wheel 37, and outputs a signal corresponding to the detected steering angle $\alpha$. When the steering angle $\alpha$ is set to zero when the driver operates the steering wheel 37, that is, when the vehicle is driven straight by steering, the steering angle $\alpha$ is a positive value when the vehicle is turned to the left by steering. On the other hand, the steering angle $\alpha$ is a negative value when the vehicle is turned to the right by steering. A rotation direction of the steering wheel 37 for increasing the steering angle $\alpha$ is called a positive direction, and a direction opposite to the positive direction is called a negative direction.

The steering torque sensor 73 detects a steering torque TQst and output a signal related to the detected steering torque TQst. The driver applies steering torque TQst to the steering wheel 37. When the torque is applied to the steering wheel 37 so as to rotate the steering wheel 37 in the positive direction, the steering torque TQst is a positive value. On the other hand, when the torque is applied to the steering wheel 37 so as to rotate the steering wheel 37 in the negative direction, the steering torque TQst is a negative value.

The tire angle sensor 71 detects a tire angle $\theta$ as a steering angle of the steered wheels 42, and outputs a signal related to the detected tire angle $\theta$. When the tire angle $\theta$ is set to "0" when the vehicle travels straight. The tire angle is a positive value when the vehicle turns to the left. On the other hand, the tire angle $\theta$ is a negative value when the vehicle turns to the right.

Output signals from sensors including the steering angle sensor 72, the steering torque sensor 73, and the tire angle sensor 71 are input to the control device 10.

Various information is input to the control device 10 from a monitoring system 81 monitoring a situation in a vicinity of the host vehicle. The monitoring system 81 includes an imaging unit such as a camera, a radar, or the like. Further, the monitoring system 81 monitors, for example, the number and position of other vehicles that are in the vicinity of the host vehicle. the monitoring system 81 also monitors whether an obstacle is in a traveling path of the host vehicle.

The control device 10 includes a steering control unit 21 controlling the steering device 30 and a support control unit 11. These control units 11 and 21 can transmit and receive various information to each other.

The support control unit 11 executes various control for supporting automatic traveling of the vehicle by using the information received from the monitoring system 81.

The steering control unit 21 has a manual operation mode and a steering support mode in which the steering device 30 is controlled.

In the manual operation mode, the steered wheel 42 is steered by operating input shaft 36. In this mode, when the steering wheel 37 is rotated by steering movement of the driver, the tire angle $\theta$ of the steered wheels 42 is changed in synchronization with a change in the steering angle $\alpha$.

The steering support mode is selectable if steering support control described below is executed. In this mode, the first motor 32 is controlled, and steering of the steered wheel 42 is assisted by driving the electric machine 31. As described below, the steering support mode includes a system priority mode, a cooperative mode, and a degenerate mode. The steering control unit 21 controls the steering device 30 according to a mode selected by the support control unit 11 among the system priority mode, the cooperative mode, and the degenerate mode.

The steering control unit 21 includes, as functional units, a steering detection unit 22, a control drive amount calculation unit 23, a steering drive amount calculation unit 24, and a control unit 25.

The steering detection unit 22 determines whether the driver steers in a situation where the steering support control is executed. This is an override determination. If the tire angle $\theta$ and the steering angle $\alpha$ are controlled, the steering detection unit 22 determines the steering support control is executed. If the steering torque TQst detected by the steering torque sensor 73, the steering detection unit 22 determines the driver steers.

The control unit 25 sets a required drive amount DAt as a drive amount of the electric machine 31. As described below, the required drive amount DAt depends on selection modes among the system priority mode, the cooperative mode, or the degenerate mode. The control unit 25 drives the electric machine 31 by controlling driving of the first motor 32 using the required drive amount DAt. Specifically, an indicated value of the current flowing to the first motor 32 is set as a drive current value IMT based on the required drive amount DAt.

The control drive amount calculation unit 23 calculates a control drive amount DAbs as a drive amount of the electric machine 31 for controlling the tire angle $\theta$ of the steered wheels 42 close to a target tire angle $\theta$Tr. The control drive amount DAbs is used to set the required drive amount DAt.

The control drive amount calculation unit 23 executes, in calculating the control drive amount DAbs, a feedforward (F/F) control and a feedback (F/B) control. In the F/F control, an F/F control amount is calculated such that the F/F control amount is a value related to the target tire angle $\theta$Tr. In the F/B control, an F/B control amount is calculated by using the target tire angle $\theta$Tr and the tire angle $\theta$.

The control drive amount calculation unit 23 calculates the control drive amount DAbs as a sum of the F/F control amount calculated by the F/F control and the F/B control amount calculated by the F/B control. The control drive amount calculation unit 23 may stop the execution of the F/B control. In this case, the control drive amount calculation unit 23 sets the F/F control amount calculated by the F/F control as the control drive amount DAbs.

The steering drive amount calculation unit 24 calculates a steering drive amount DAst, which is a drive amount of the electric machine 31 related to the steering torque TQst applied to the steering wheel 37 by the driver. The steering drive amount DAst is calculated by using the steering torque TQst. That is, the steering drive amount DAst is a value for assisting a rotation of the steering wheel 37 during steering movement of the driver. The steering drive amount DAst is used to set the required drive amount DAt.

When the above-described manual operation mode is selected, the steering drive amount DAst calculated by the steering drive amount calculation unit 24 is set as the required drive amount DAt.

A processing routine of steering support control executed when the traveling of the vehicle is described below with FIG. 2. The processing routine is repeatedly executed at predetermined intervals when the steering support mode is selected.

When the execution of the processing is started, first, in step S101, mode selection processing is executed by the support control unit 11. In the mode selection processing, one mode among the system priority mode, the cooperative mode, and the degenerate mode that are prepared as the steering support mode is selected.

The system priority mode is a mode for the vehicle traveling according to a traveling path set by the support control unit 11. That is, the system priority mode is a mode for operating the steering device 30 independent of the steering of the driver. For example, when no other vehicles or obstacles are present in the vicinity of the host vehicle other than a preceding vehicle traveling in front of the host vehicle, the system priority mode is selected in the mode selection processing. Even if no obstacles are present in the vicinity of the host vehicle and no other vehicles are present in the vicinity of the host vehicle, the system priority mode is selected in the mode selection processing. The obstacle mentioned here means an obstacle having a certain size necessary for the vehicle to avoid a collision.

In the cooperative mode, the driver is allowed to steer even when the vehicle is in the automatic traveling supporting the automatic traveling of the vehicle. When less than a specified number (for example, two) of other vehicles are present in the vicinity of the host vehicle in addition to a preceding vehicle traveling in front of the host vehicle, the cooperative mode can be selected in the mode selection processing.

In the degenerate mode, the control of the steering device 30 in the steering support mode is allowed to change into the control of the steering device 30 in the manual operation mode. When equal to or more than a specified number of other vehicles are present in the vicinity of the host vehicle in addition to a preceding vehicle traveling in front of the host vehicle, the degenerate mode can be selected in the mode selection processing.

When a mode selection is completed in the mode selection processing in step S101, the processing shifts to step S102.

In step S102, the support control unit 11 sets a traveling path of the vehicle. The traveling path is created based on information obtained by the monitoring system 81. Once the traveling path is set, a target yaw rate YrTr, which is a target value of a yaw rate of the vehicle, and a target lateral acceleration GyTr, which is a target value of a lateral acceleration of the vehicle, are calculated, and then the vehicle travels along the traveling path. The lateral acceleration is an acceleration component in a vehicle width direction in an acceleration of the vehicle. After that, the processing shifts to step S103.

In step S103, the support control unit 11 calculates the target tire angle θTr by using the target yaw rate YrTr, the target lateral acceleration GyTr, and the like that are derived in step S102. Then, the processing shifts to step S105.

In step S105, the steering detection unit 22 performs the override determination. the steering detection unit 22 determines that steering override is in progress (S105: YES), the processing proceeds to step S106.

In step S106, the steering drive amount calculation unit 24 calculates an assist torque TQas. The assist torque TQas is a torque for assisting the rotation of the steering wheel 37 during steering movement of the driver. The assist torque TQas is a torque input to the steering wheel 37 by driving the first motor 32, that is, driving the electric machine 31. The assist torque TQas is derived to be a value corresponding to the steering torque TQst using, for example, a map shown in FIG. 3.

Figure 3:
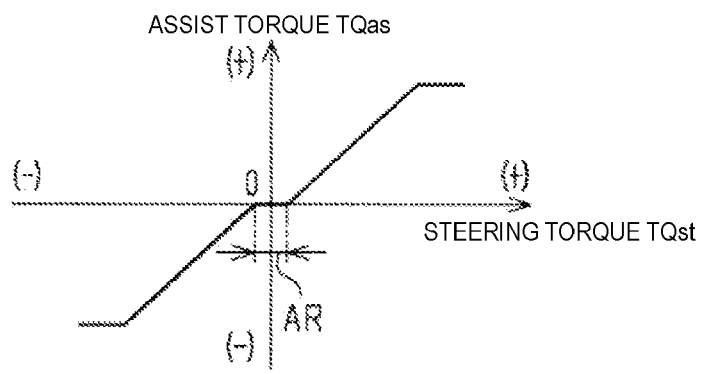
FIG. 3 is a map of relation between a steering torque and an assist torque.

FIG. 3 shows relation between the steering torque TQst and the assist torque TQas. In FIG. 3, a torque region that can be regarded as having a steering torque TQst of substantially zero is defined as a dead zone region AR. When the steering torque TQst is included in the dead zone region AR, the assist torque TQas is zero. On the other hand, when the steering torque TQst is greater than a value in the dead zone region AR, the assist torque TQas is a positive value. Specifically, the higher the steering torque TQst is, the higher the assist torque TQas is. When the steering torque TQst is less than a value in the dead zone region AR, the assist torque TQas is a negative value. Specifically, the less the steering torque TQst is, the less the assist torque TQas is.

Then, the processing shifts to step S107 after the assist torque TQas is calculated. In step S107, the steering control unit 21 executes mediation processing. In the mediation processing, processing corresponding to the mode selected in step S101 is executed. As described below, the required drive amount DAt is set by executing the mediation processing. After the required drive amount DAt is set, the processing shifts to step S108.

In step S108, the drive current value IMT is flowed through the first motor 32 by the control unit 25 of the steering control unit 21. The control unit 25 controls the electric machine 31, and drives the first motor 32 on the basis of the required drive amount DAt. As the steering angle α is changed by the electric machine 31, the tire angle θ of the steered wheels 42 is changed in synchronization with the change in the steering angle α. After that, the processing routine temporarily ends.

In the processing in step S105, as when it is determined that no steering override is in progress (S105: NO), the processing proceeds to step S109. In step S109, the control drive amount calculation unit 23 calculates the control drive amount DAbs The control drive amount calculation unit 23 calculates the control drive amount DAbs as a sum of the F/F control amount and the F/B control amount. After the control drive amount DAbs is calculated, the processing shifts to step S110.

In step S110, the control drive amount calculation unit calculates a control drive amount DAbs1 through the execution of limiting processing. The limiting processing is processing for preventing a sudden change in the steering angle α when the steering angle α and the tire angle θ are changed by executing the steering support control. In the limiting processing, the control drive amount DAbs1 is calculated such that an increase speed of the control drive amount DAbs1 does not exceed an upper limit increase speed. Then, when an increase in the control drive amount DAbs is stopped and held, the control drive amount DAbs1 is increased until the control drive amount DAbs is reached, and then is held at the same value as the control drive amount DAbs. After the control drive amount DAbs1 is calculated, the processing shifts to step S111.

In step S111, a value of the control drive amount DAbs1 calculated in step S110 is set as the required drive amount DAt. After that, the processing shifts to step S108.

In step S108, the drive current value IMT is flowed through the first motor 32 by the control unit 25. As the electric machine 31 is driven on the basis of the required drive amount DAt, the steering angle α of the steering wheel 37 and the tire angle θ of the steered wheels 42 are changed in synchronization with the change in the steering angle α. After that, the processing routine temporarily ends.

The processing in the above-described step S110 may be omitted. In this case, in step S111, a value of the control drive amount DAbs calculated in step S109 is set as the required drive amount DAt. That is, when no the steering override is in progress, the electric machine 31 may be driven on the basis of the calculated control drive amount DAbs without performing the limiting processing.

Figure 4:
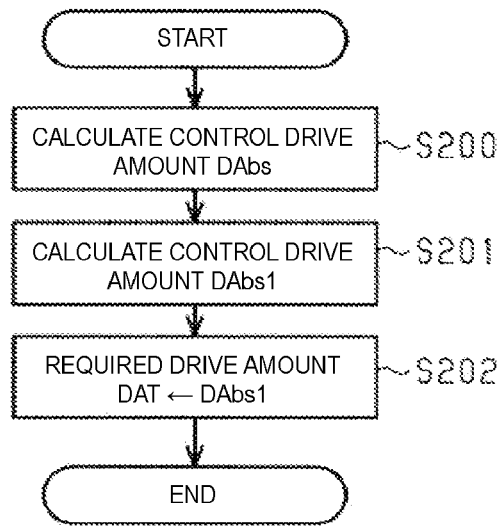
FIG. 4 is a flowchart of a processing executed by a steering control unit of the same control device in a system priority mode.
Figure 5:
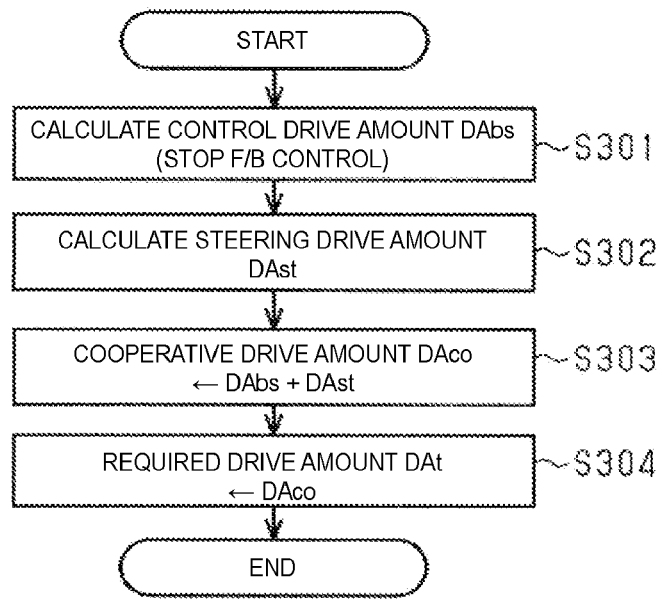
FIG. 5 is a flowchart of a processing executed by the steering control unit of the same control device in a cooperative mode.
Figure 6:
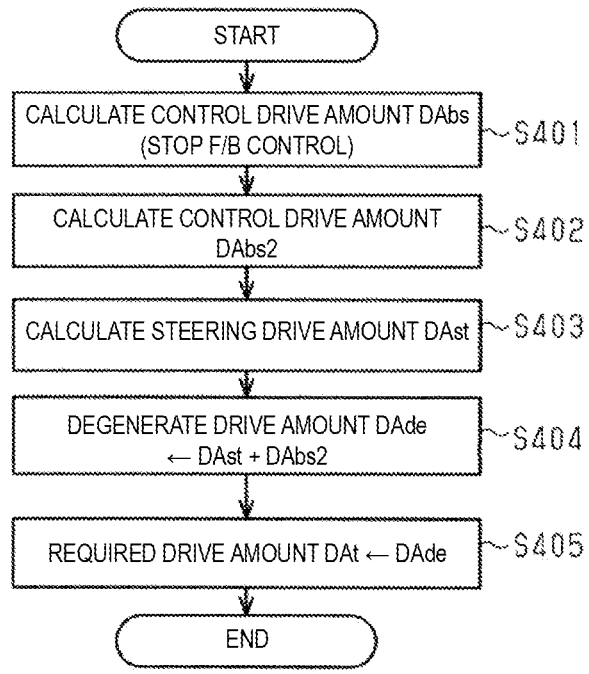
FIG. 6 is a flowchart of a processing executed by the steering control unit of the same control device in a degenerate mode.
Figure 7:
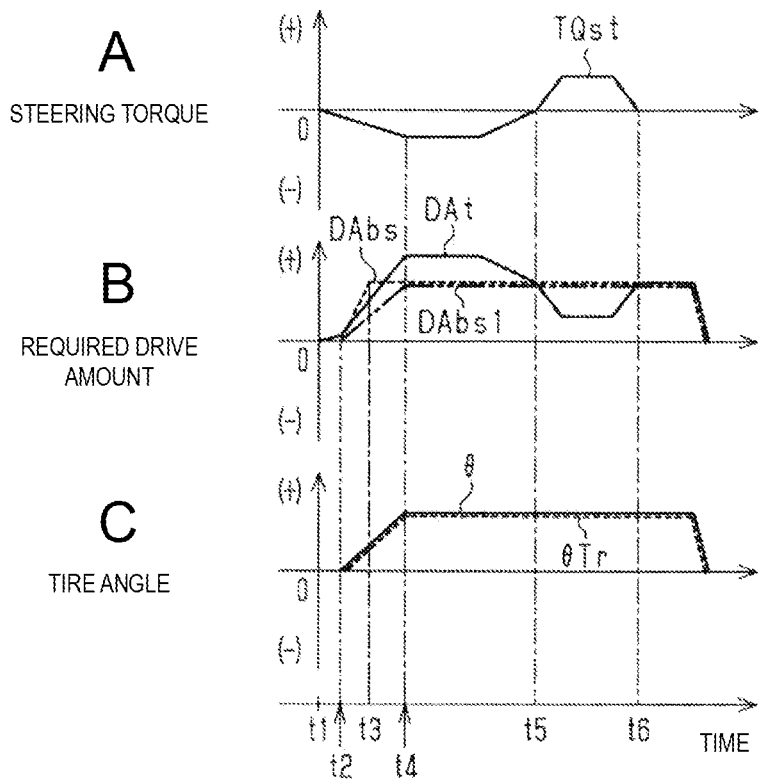
FIGS. 7A to 7C are timing charts in the system priority mode.
Figure 8:
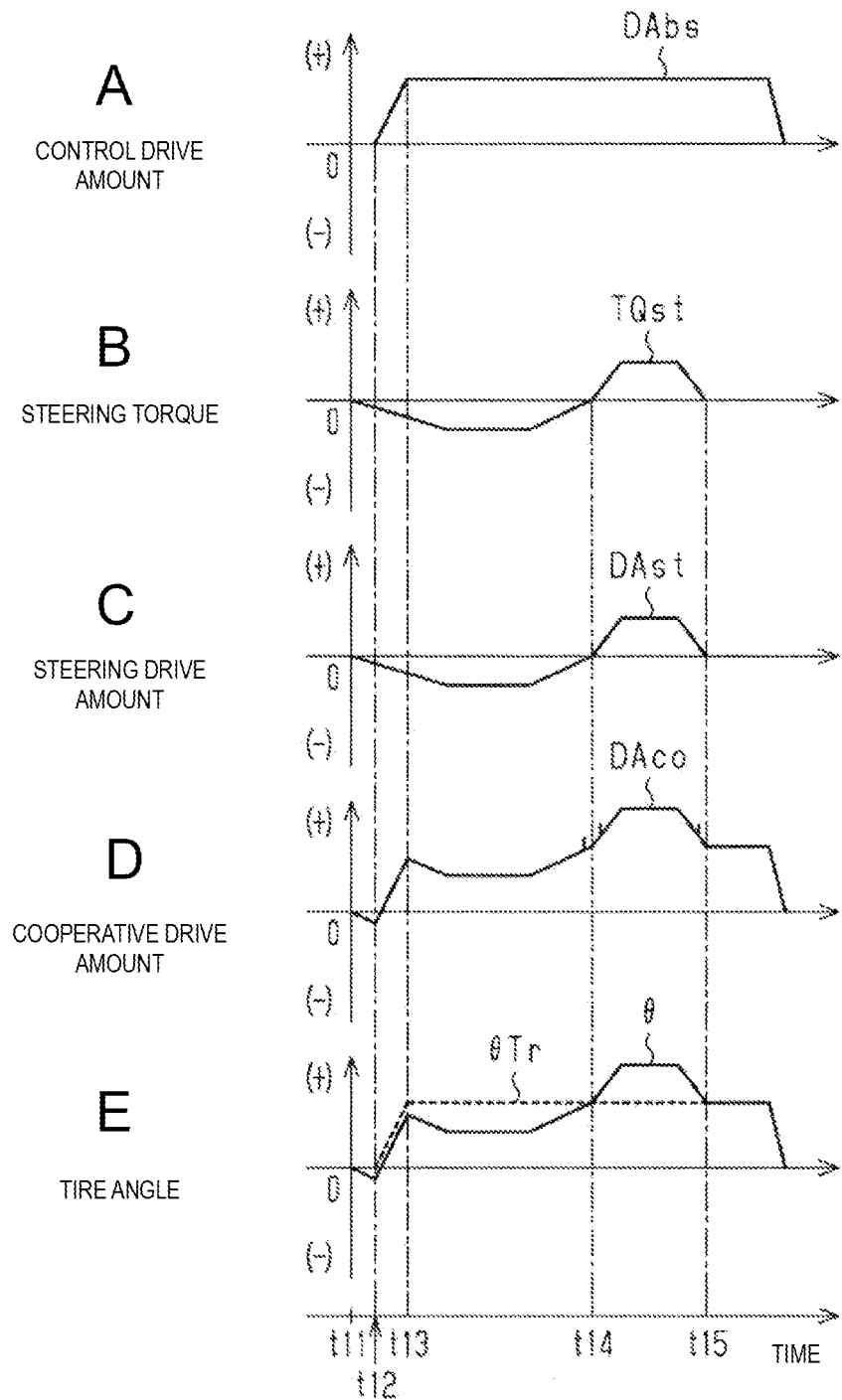
FIGS. 8A to 8E are timing charts in the cooperative mode.

The mediation processing will be described with reference to FIGS. 4 to 6.

A processing routine of the mediation processing executed by the steering control unit 21 while the system priority mode is selected will be described with reference to FIG. 4. This processing is executed in the processing in step S107 shown in FIG. 2 while the system priority mode is selected in the processing in step S101 shown in FIG. 2.

When the execution of this processing is started, the control drive amount calculation unit 23 calculates the control drive amount Dabs in step S200 in the same manner as in the above-described step S109. After the control drive amount DAbs is calculated, the processing shifts to step S201.

In step S201, the control drive amount calculation unit 23 calculates the control drive amount DAbs1 through the execution of the limiting processing in the same manner as in the above-described step S110. When the control drive amount DAbs1 is calculated, the processing shifts to step S202.

In step S202, the control drive amount DAbs1 is set as the required drive amount DAt. After that, the processing routine ends.

Next, a processing routine of the mediation processing executed by the steering control unit 21 while the cooperative mode is selected will be described with reference to FIG. 5. The present processing is executed in the processing in step S107 shown in FIG. 2 when the cooperative mode is selected in the processing in step S101 shown in FIG. 2.

After the execution of this processing is started, the control drive amount calculation unit 23 calculates the control drive amount DAbs in step S301. The F/B control is stopped on the basis of the target tire angle θTr and the tire angle θ. Then, the control drive amount DAbs is calculated. That is, the control drive amount calculation unit 23 calculates the F/F control amount by the F/F control, and sets the F/F control amount as the control drive amount DAbs. After that, the processing shifts to step S302.

In step S302, the steering drive amount calculation unit 24 calculates the steering drive amount DAst. Here, the steering drive amount DAst is calculated such that the assist torque TQas calculated in the above-described step S106 is applied to the steering wheel 37. The steering drive amount DAst is calculated such that the higher the assist torque TQas is, that is, the higher the steering torque TQst is, the larger the steering drive amount DAst is. After that, the processing shifts to step S303.

In step S303, the control unit 25 calculates a cooperative drive amount DAco. The cooperative drive amount DAco is calculated as a sum of the control drive amount DAbs calculated in step S301 and the steering drive amount DAst calculated in step S302. After that, the processing shifts to step S304.

In step S304, the control unit 25 sets a value of the cooperative drive amount DAco as the required drive amount DAt. After that, the processing routine ends.

Figure 2:
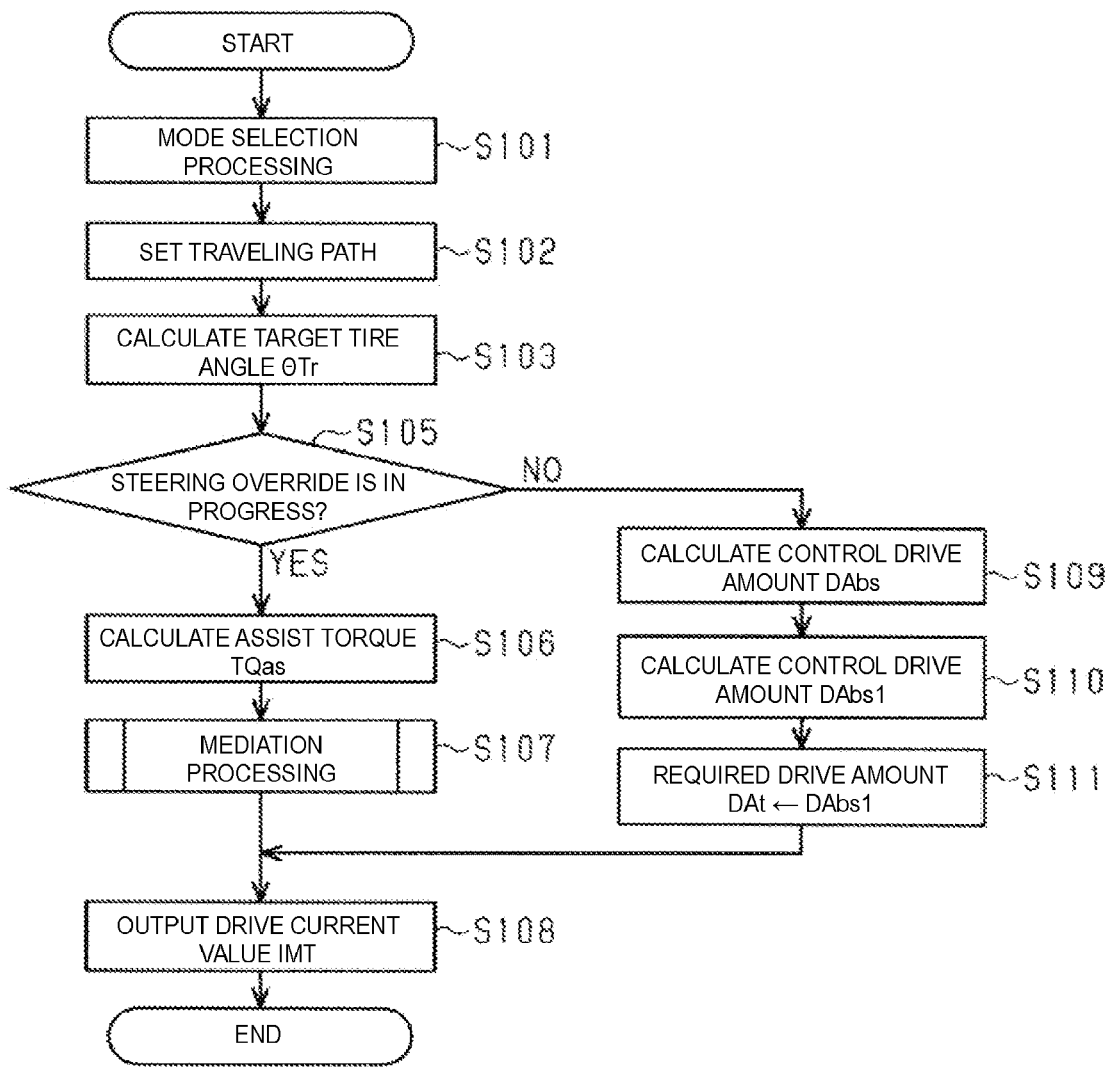
FIG. 2 is a flowchart of a processing routine of steering support control executed by the same control device.

While the cooperative mode is selected, in the processing in step S108 shown in FIG. 2, the control unit 25 may output a drive amount corresponding to a value obtained by adding a specified amount to the cooperative drive amount DAco when the tire angle θ changes relative to the target tire angle θTr from the electric machine 31, and then may output the drive amount corresponding to the cooperative drive amount DAco from the electric machine 31. In this case, since a period for outputting the drive amount corresponding to the value obtained by adding the specified amount to the cooperative drive amount DAco from the electric machine 31 is short, the tire angle θ does not change even if a drive amount different from the cooperative drive amount DAco is output from the electric machine 31.

A processing routine of the mediation processing executed by the steering control unit 21 while the degenerate mode is selected be described with reference to FIG. 6. This processing is executed in the processing in step S107 shown in FIG. 2 while the degenerate mode is selected in the processing in step S101 shown in FIG. 2.

When the execution of the present processing is started, the control drive amount calculation unit 23 calculates the control drive amount DAbs in step S401 in the same manner as in the step S301. The control drive amount DAbs is the F/F control amount calculated by the F/F control. After that, the processing shifts to step S402.

In step S402, the control drive amount calculation unit 23 calculates a control drive amount DAbs2 through an execution of degenerate processing. The degenerate processing is processing for determining a driving mode of the electric machine 31 at the time of transition from the steering support mode to the manual operation mode. Specifically, when the control drive amount DAbs at a time point when it is determined that the steering override is in progress is set as an initial value of the control drive amount DAbs2, in the degenerate processing, the control drive amount DAbs2 is changed from the initial value to zero at a defined speed. After the control drive amount DAbs2 is calculated, the processing shifts to step S403.

In step S403, the steering drive amount calculation unit 24 calculates the steering drive amount DAst in the same manner as in the above-described step S302. After that, the processing shifts to step S404.

In step S404, the control unit 25 calculates a degenerate drive amount DAde. The degenerate drive amount DAde is calculated as a sum of the control drive amount DAbs2 calculated in step S402 and the steering drive amount DAst calculated in step S403. After that, the processing shifts to step S405.

In step S405, the control unit 25 sets a value of the degenerate drive amount DAde as the required drive amount DAt. After that, the processing routine ends.

An action and an effect of this embodiment be described below.

(1) A case where the system priority mode is selected be described below with reference to FIGS. 7A to 7C. In this example, as shown in FIG. 7A, the steering torque TQst is zero at a timing t1. In a period from the timing t1 to a timing t5, the steering torque TQst based on steering movement of the driver is detected as a negative value. The steering torque TQst approaches zero as the time approaches the timing t5, and the steering torque TQst is zero at the timing t5. In a period from the timing t5 to a timing t6, the steering torque TQs based on steering movement of the driver is detected as a positive value. The steering torque TQst approaches zero as the time approaches the timing t6, and the steering torque TQst is zero at the timing t6.

When the steering torque TQst is not zero, it is determined that the steering override is in progress. In the example shown in FIGS. 7A to 7C, the determination of the steering override has been in progress after the timing t1 before the timing t6.

In the system priority mode, the control drive amount DAbs is calculated (S200), and the control drive amount DAbs1 is calculated through the limiting processing (S201). Then, the control drive amount DAbs1 is set as the required drive amount DAt (S202). Then, the required drive amount DAt changes during steering movement of the driver as shown by a solid line in FIG. 7B.

The control drive amount DAbs1 is calculated the basis of on the control drive amount DAbs calculated as a sum of the F/F control amount and the F/B control amount. Then, the electric machine 31 is controlled on the basis of the control drive amount DAbs1. Therefore, the tire angle θ independents form steering movement of the driver. As a result, as shown in FIG. 7C, the steered wheel 42 is controlled such that the tire angle θ shown by the solid line approaches the target tire angle θTr shown by a broken line.

According to the system priority mode executed by the support control unit 11 described above, the steering torque caused by the driver TQst is canceled. Then the vehicle can be caused to travel according to the traveling path set by the support control unit 11.

In FIG. 7B, the control drive amount DAbs without steering movement is shown by a broken line, and the control drive amount DAbs1 calculated through the limiting processing on the basis of the control drive amount DAbs indicated by an alternate long and short dash line. The control drive amount DAbs starts increasing from the timing t2, and holds at a constant value after the timing t3. The control drive amount DAbs1 starts increasing from the timing t2, and holds at a constant value after the timing t4. Without steering movement steering is not performed, the control drive amount DAbs1 indicated by the alternate long and short dash line is set as the required drive amount DAt, and the electric machine 31 is controlled on the basis of the required drive amount DAt. As a result, as shown in FIG. 7C, the steered wheel 42 is controlled such that the tire angle θ shown by the solid line approaches the target tire angle θTr shown by the broken line.

(2) A case where the cooperative mode is selected will be described with reference to FIGS. 8A to 8E. In this embodiment, as shown in FIG. 8B, the steering torque TQst is zero at a timing t11. In a period from the timing t11 to a timing t14, a negative value of the steering torque TQst by an operation of the steering wheel 37 by the driver is detected. The steering torque TQst approaches zero as the time approaches the timing t14, and the steering torque TQst is zero at the timing t14. In a period from the timing t14 to a timing t15, a positive value of the steering torque TQst by an operation of the steering wheel 37 by the driver is detected. The steering torque TQst approaches zero as the time approaches the timing t15, and the steering torque TQst is zero at the timing t15.

In the example shown in FIGS. 8A to 8E, when the steering torque TQst is not zero after the timing t11, it is determined that the steering override is in progress. Then, the determination of the steering override has been in progress is continued until the timing t15.

In the cooperative mode, as shown in FIG. 8C, the steering drive amount DAst is calculated as a value based on the steering torque TQst shown in FIG. 8B (S302).

Further, in the cooperative mode, as shown in FIG. 8D, the cooperative drive amount DAco is calculated by summing the control drive amount DAbs shown in FIG. 8A and the steering drive amount DAst shown in FIG. 8C (S303). As shown in FIG. 8A, the control drive amount DAbs starts increasing from the timing t12 and holds after the timing t13. Therefore, the cooperative drive amount DAco shown in FIG. 8D fluctuates in a period from the timing t13 to the timing t15 in a manner of corresponding to the fluctuation of the steering drive amount DAst.

The value of the cooperative drive amount DAco is set as the required drive amount DAt, and the electric machine 31 is driven on the basis of the required drive amount DAt, so that the tire angle θ is changed as shown in FIG. 8E. In the cooperative mode, the F/B control is stopped when the control drive amount DAbs is calculated (S301). This allows a difference occur between the tire angle θ and the target tire angle θTr. In a period from the timing t11 to the timing t14, the negative steering torque TQst is detected. In this period, the tire angle θ is a value closer to zero than the target tire angle θTr. On the other hand, in a period from the timing t14 to the timing t15, the positive steering torque TQst is detected. In this period the tire angle θ is greater than the target tire angle θTr.

According to the cooperative mode executed by the support control unit 11 in this manner, when the driver steers the steering wheel in a state where the steering support control is being executed, the electric machine 31 is driven on the basis of the cooperative drive amount DAco. The cooperative drive amount DAco depends not only on the control drive amount DAbs based on the target tire angle θTr, but also on the steering drive amount DAst based on the steering torque TQst due to the steering of the driver. Therefore, even during steering movement of the driver while steering support control is being executed, the steering angle α of the steering wheel 37 can be changed related to the steering torque TQst. As a result, the steered wheel 42 can be steered according to the steering performed by the driver. Therefore, during steering movement of the driver in a state where the steering support control is executed, steering of the steered wheel 42 on the basis of the steering performed by the driver is not different from actual steering. This can prevent the driver from feeling uncomfortable.

In the cooperative mode executed by the support control unit 11, while the tire angle θ changes relative to the target tire angle θTr, a period for outputting, from the electric machine 31, the drive amount corresponding to the value obtained by adding the specified amount to the cooperative drive amount DAco is temporarily provided. Since the period is short, the tire angle θ does not change due to a change in a torque output from the electric machine 31. Such a change in torque is also transmitted to the steering wheel 37 and the driver who touches the steering wheel 37. Therefore, through the steering performed by the driver, the driver can be informed that the tire angle θ is separated from the target tire angle θTr, or that the tire angle θ is close to the target tire angle θTr.

Even in the cooperative mode, when steering is not performed, the required drive amount DAt is set to the control drive amount DAbs1 calculated in step S110 based on the control drive amount DAbs (=F/F control amount+F/B control amount) calculated in step S109. Then, the electric machine 31 is controlled on the basis of the required drive amount DAt, the tire angle θ is controlled such that the tire angle θ is set to the target tire angle θTr, and the steering angle α is changed in synchronization with the change in the tire angle θ.

(3) A case where the degenerate mode is selected described below with reference to FIGS. 9A to 9E. In this example, as shown in FIG. 9B, the steering torque TQst is zero at a timing t21. In a period from the timing t21 to a timing t24, the steering wheel 37 is operated and the steering torque TQst is detected. In the example shown in FIGS. 9A to 9E, the steering override is in progress at a time point of the timing t22. Once it is determined that the steering override is in progress, it has been determined that the steering override is in progress until the steering wheel 37 is no longer operated, that is, until the timing t24.

It has been determined that the steering override is not in progress until the timing t22. Here, the required drive amount DAt is set to the control drive amount DAbs (=F/F control amount+F/B control amount) calculated in step S109. Then, the electric machine 31 is controlled on the basis of the required drive amount DAt. Therefore, the tire angle θ is controlled and the steering angle α is changed in synchronization with the change in the tire angle θ such that the tire angle θ is set to the target tire angle θTr.

When it is determined that steering override is in progress at the timing t22, the control drive amount DAbs2 is calculated by the degenerate processing (S402). In FIG. 9A, the control drive amount DAbs is shown by a broken line, and the control drive amount DAbs2 is shown by a solid line. The control drive amount DAbs2 starts decreasing from the timing t22 and is zero at the timing t23.

Further, in the degenerate mode, as shown in FIG. 9C, the steering drive amount DAst is calculated as a value based on the steering torque TQst shown in FIG. 9B (S403).

In the degenerate mode, as shown in FIG. 9D, the degenerate drive amount DAde is calculated by summing the control drive amount DAbs2 shown in FIG. 9A and the steering drive amount DAst shown in FIG. 9C (S404).

Then, the value of the degenerate drive amount DAde is set as the required drive amount DAt, and the electric machine 31 is driven on the basis of the required drive amount DAt, so that the tire angle θ is changed as shown in FIG. 9E. That is, as the time approaches the timing t23 from the timing t22, the ratio of the steering drive amount DAst to the required drive amount DAt increases. After the timing t23, the electric machine 31 is driven on the basis of the steering drive amount DAst related to the steering torque TQst. Accordingly, after the timing t23, the vehicle can turn according to the steering of the steering wheel 37 performed by the driver. That is, according to the degenerate mode, a transition from the steering support mode to the manual operation mode can be facilitated.

The present embodiment can be implemented by modifications as follows. The present embodiment and the following modifications can be implemented in combination with each other in a scope without technical contradiction.

In the cooperative mode, a period for controlling the electric machine 31 on the basis of the sum of the cooperative drive amount DAco and the specified value is provided. Regarding the specified value, when the positive steering torque TQst is applied to the steering wheel 37, the specified value may be set to a negative value, while when the negative steering torque TQst is applied to the steering wheel 37, the specified value may be set to a negative value.

In the cooperative mode, processing of providing a period for controlling the electric machine 31 on the basis of the sum of the cooperative drive amount DAco and the specified value may be executed only when a deviation between the tire angle θ and the target tire angle θTr is less than the specified amount.

The steering device 30 shown in FIG. 1 has the connecting mechanism 34. The second motor 35 of the connecting mechanism 34 can alternate driving with stopping so that the torque applied to the steering wheel 37 may be changed. The driver can be informed that the tire angle θ is separated from the target tire angle θTr, or that the tire angle θ is close to the target tire angle θTr by using the change of the torque during steering movement of the driver In a configuration according to the above-described embodiment, in the cooperative mode, by providing the period for controlling the electric machine 31 based on the sum of the cooperative drive amount DAco and the specified value, the driver is given a notification. Instead of the configuration as described above, a notify device 82 mounted on the vehicle is connected to the control device 10 as shown by the broken line in FIG. 1, and the driver can be given a notification by controlling the notify device 82. As the notify device 82, for example, a speaker that emits a warning sound and a lamp that gives a notification by lighting can be adopted.

In the above-described embodiment, in the cooperative mode, the sum of the control drive amount DAbs and the steering drive amount DAst is calculated as the cooperative drive amount DAco. The cooperative drive amount DAco may be the sum of a drive amount obtained by multiplying the steering drive amount DAst by a correction coefficient, and the control drive amount DAbs. As the correction coefficient, a value that is greater than zero and is equal to or less than one can be used. By setting the correction coefficient to a value closer to zero as there are fewer obstacles in the vicinity of the host vehicle, and to a value closer to one as there are more obstacles in the vicinity of the host vehicle, the steering drive amount DAst used for calculating the cooperative drive amount DAco can be weighted. Accordingly, the steering ratio reflected in the turning of the vehicle in the cooperative mode can be adjusted.

In the above-described embodiment, in the override determination executed by the steering detection unit 22, whether the steering override is performed is determined based on the steering torque TQst. Instead of such an override determination, whether the steering override is performed can also be determined depending on whether the driver of the vehicle is touching the steering wheel 37. Whether the driver is touching the steering wheel 37 can be detected by, for example, mounting a touch sensor with the steering wheel 37.

If the tire angle θ of the steered wheels 42 can be changed in synchronization with the rotation of the steering wheel 37, the steering device to which the control device 10 is applied may be a device having a configuration different from that of the steering device 30 shown in FIG. 1.

The invention claimed is:

1. A driving assistance device that is applied to a vehicle including a steering device that, by driving an electric machine, assists steering and changes a tire angle which is a steering angle of a vehicle wheel related to a change in a steering angle that is a rotation angle of a steering wheel, and that implements steering support control for changing the tire angle and the steering angle by driving the electric machine based on a target tire angle which is a target value of the tire angle, the driving assistance device for the vehicle comprising:
- a control drive amount calculation unit configured to calculate a control drive amount in a state where the steering support control is executed, the control drive amount being a first drive amount of the electric machine based on the target tire angle;
- a steering drive amount calculation unit configured to calculate a steering drive amount related to a steering torque, the steering drive amount being a second drive amount of the electric machine, the steering torque being a torque applied to the steering wheel by a driver; and
- a control unit configured to calculate a sum of the control drive amount and the steering drive amount as a cooperative drive amount and control the electric machine based on the cooperative drive amount during steering movement of the driver in the state where the steering support control is executed, wherein in the state where the steering support control is executed, when a traveling path is allowed change by the steering movement of the driver and a steering override is in progress, the control drive amount is a calculated feedforward control amount calculated by performing a feedforward control.

2. The driving assistance device for the vehicle of claim 1, wherein
the control drive amount is a calculated feedforward control amount calculated by performing a feedforward control during steering movement of the driver in the state where the steering support control is executed.

3. The driving assistance device for the vehicle of claim 1, wherein
during steering movement of the driver in the state where the steering support control is executed, the control unit gives a notification to the driver if the tire angle changes relative to the target tire angle.

4. The driving assistance device for the vehicle of claim 1, wherein
during steering movement of the driver in the state where the steering support control is executed, if the tire angle changes relative to the target tire angle, the control unit outputs a drive amount of the electric machine related to a value obtained by adding a specified amount to the cooperative drive amount, and then outputs the cooperative drive amount of the electric machine.

5. The driving assistance device for the vehicle of claim 2, wherein
during steering movement of the driver in the state where the steering support control is executed, the control unit gives a notification to the driver if the tire angle changes relative to the target tire angle.

6. The driving assistance device for the vehicle of claim 2, wherein
during steering movement of the driver in the state where the steering support control is executed, if the tire angle changes relative to the target tire angle, the control unit outputs an output drive amount of the electric machine related to a value obtained by adding a specified amount to the cooperative drive amount, and then outputs the cooperative drive amount of the electric machine.

* * * * *